though the tread is compressed and the initial seal effected, the tire is...

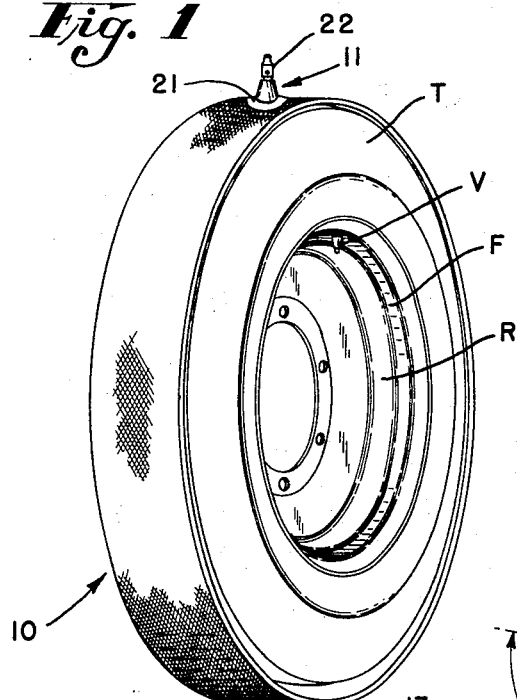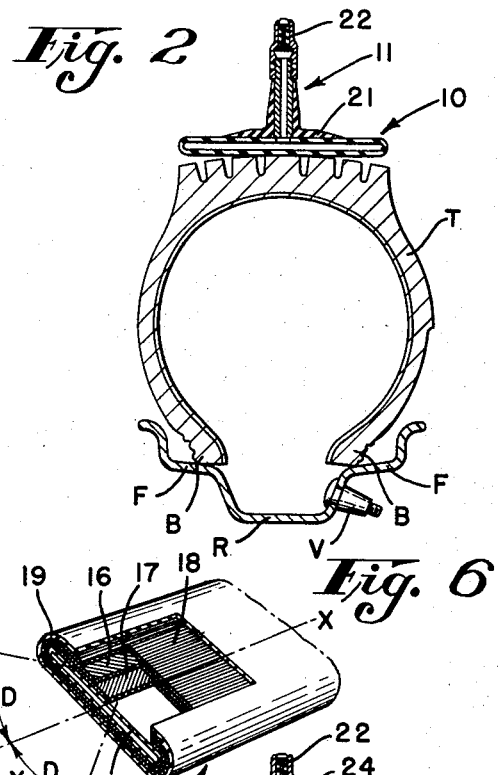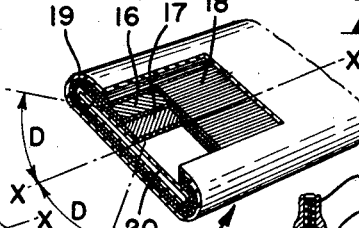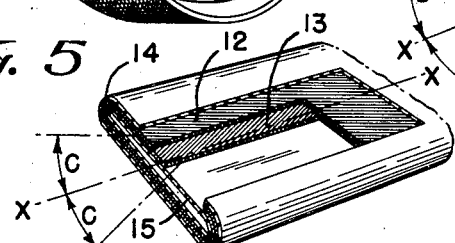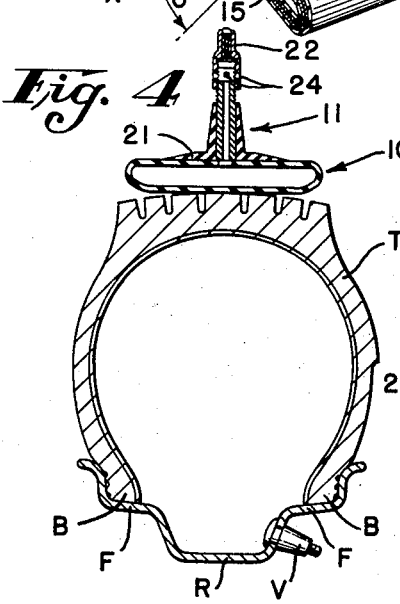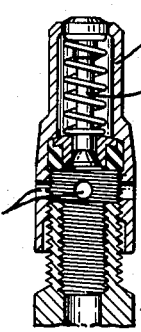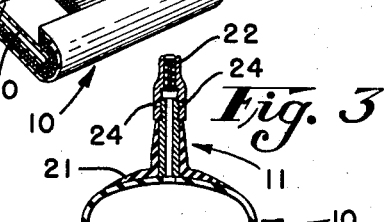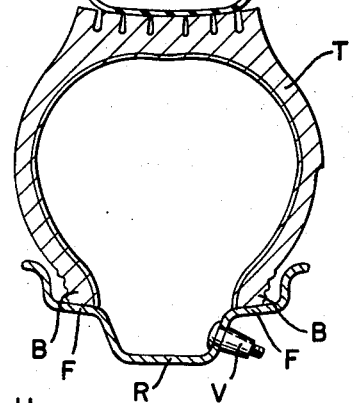
June 9, 1959 — F. A. MULBARGER — 2,889,870
TUBELESS TIRE BEAD SEATING DEVICE
Filed May 3, 1955
INVENTOR.
FRANCIS A. MULBARGER
ATTORNEY.

United States Patent Office 2,889,870
Patented June 9, 1959

2,889,870

TUBELESS TIRE BEAD SEATING DEVICE

Francis A. Mulbarger, Indianapolis, Ind., assignor to United States Rubber Company, New York, N.Y., a corporation of New Jersey Application May 3, 1955, Serial No. 505,693

5 Claims. (Cl. 157—1.21)

This invention relates to a method and apparatus for mounting tires and in particular to a method and apparatus for effecting the initial seal between the rim and the bead portions of so-called tubeless tires preparatory to the inflation thereof.

A tubeless tire, as the name implies, has no inner tube. The tire and rim together form the air container. The valve for inflating the tire is clamped or snapped in the valve stem opening through the rim. As the air container is formed by both the tire and the rim, an initial seal between the tire and rim must be effected before the tire can be inflated. After partial inflation of the tire, the pressure within the tire will maintain the beads of the tire in sealing engagement with the flanges of the rim.

To obtain such an initial seal, it has been the practice to place a metal band circumferentially around the tread of the tire after the tire has been placed on the rim and to compress the tread of the tire by shortening the effective length of the band by some type of mechanical linkage. Compression of the tread of the tire spreads the beads of the tire and forces the beads against the ledges of the rim to effect the initial seal. While the tread is so compressed and the initial seal effected, the tire is inflated by the introduction of fluid under pressure through the valve in the rim. After sufficient pressure has been built up in the tire to retain the seal between the beads and the rim, the band is removed. U.S. Patent No. 1,966,580, assigned to the same assignee as the instant application, discloses this method and apparatus for effecting the initial seal.

The instant invention contemplates the compression of the tread of a tubeless tire to spread the beads thereof and effect the initial seal between the beads and the rim ledges by placing an inflatable tube around the tread of the tire and inflating the tube so that the tread of the tire will be compressed by the tube as the tube expands, and the present invention is particularly directed to the structure of a tube for this purpose.

A tube type tread compressor as contemplated by the instant invention, has many advantages as compared to the metal band type compressor heretofore used. One advantage is that it does not require any adjustment in length when used for different size tires within the popular size range. Another advantage is that it contacts a wider area of the tire tread and forces the beads into initial sealing position with less pressure and consequently with less distortion of the tread. Because of its wider contact area and lower operating pressure, the tube type tread compressor is safer to use because it is less subject to breaking or slipping off the tire. The time required for mounting a tubeless tire with the tube type tread compressor of the present invention is about one-half that required in using a metal band type compressor. The tube type tread compressor being completely flexible, it can be rolled up and stored more conveniently and in less space than the metal band type tread compressor.

The present invention also contemplates the provision of a novel valving arrangement for the tube so that it can be easily deflated concurrently with the pressure build-up in the tire, thereby providing an additional safety factor as compared to the metal band type tread compressor which must be completely loosened before or during final inflation of the tire or otherwise it will slip off or break and possibly cause injury to the operator.

Other objects and advantages of the invention will become apparent from the following description when read in conjunction with the accompanying drawings wherein:

Fig. 1 is a perspective view of a tubeless tire mounted on a rim and showing the tube type tread compressor of the present invention positioned around the tread of the tire preparatory to the inflation thereof to compress the tread of the tire and thereby effect initial sealing of the beads against the rim so that the tire can be inflated;

Fig. 2 is a sectional view of the tubeless tire, rim and tube type tread compressor of Fig. 1, showing the relative position of the beads of the tire and the rim prior to the spreading of the bead portions to effect a seal with the rim ledges;

Fig. 3 is a sectional view similar to that of Fig. 2, but showing the tube type tread compressor inflated and expanded to compress the tread of the tire and thereby spread the beads to effect the initial seal between the beads and the rim ledges so that the tire can be inflated;

Fig. 4 is a sectional view similar to that of Fig. 3, but showing the tire after the tire has been partially inflated and the tube type tread compressor partially deflated;

Fig. 5 is a perspective sectional view, with parts broken away, showing the internal construction of one form of the tube type compressor of the invention;

Fig. 6 is a perspective sectional view, similar to that of Fig. 5, but showing an alternate construction for the tube type tread compressor of the invention; and Fig. 7 is a sectional view of the inflating and deflating valve for the tube type tread compressor of the invention which permits concurrent deflation thereof as the tire is inflated.

As shown in Figs. 1 and 2 of the drawings, the inflatable tube of the invention, designated in the drawings by the reference numeral 10, is of flattened, continuous, band shape when in collapsed or uninflated condition. The tube is adapted to be inflated through a valve stem 11 carried by the outer circumferential wall of the tube.

In utilizing the tube 10 to effect the initial seal between the beads B of a tubeless tire T and the ledges F of a rim R so that the tire T can be inflated through the usual valve stem V carried by the rim R, the tube 10, while in a collapsed, flattened condition, is placed circumferentially around the tread of the tire T, as shown in Figs. 1 and 2. The tube 10 is approximately as wide as the tread and has an inner diameter when uninflated such that it will fit around a variety of sizes of tires. The tube 10 is next inflated by the introduction of fluid under pressure through the valve 11. Inflation of the tube 10 results in a decrease in the inner diameter of the tube as the tube expands from the flattened shape shown in Figs. 1 and 2 to a more rounded shape as shown in Fig. 3, with a consequent application of inward pressure on the crown of the thread of the tire T. This circumferential compression of the crown of the tire results in outward thrust of the tire beads B so that the tire beads B are forced against the rim ledges F to thereby effect an initial seal, as shown in Fig. 3, so that the tire T can be inflated by introduction of fluid through the usual valve V. The tire T is next inflated through valve V and as the pressure builds up within the tire, the tube 10 is concurrently deflated, as shown in Fig. 4. As soon as sufficient pressure has been built up in the tire to retain the beads in sealing engagement with the flanges of the rim, the tube 10 is removed and inflation of the tire continued.

The tube 10 is formed of rubberized weftless or weakened weft rubberized cord fabric of the type used in the manufacture of pneumatic tire casings. The individual cords of the cord fabric may be nylon, cotton, rayon, steel, glass or other relatively flexible material. The cord fabric is coated or covered with flexible, resilient rubber, either natural or synthetic to render the fabric fluid impermeable.

Preferably the individual cords are so laid or positioned that the tube will take an oblate or eliptical shape, as shown in Fig. 3, when the tube is inflated. This prevents the tube from rolling off the crown of the tire upon inflation, as might occur if the tube became completely round on inflation.

In the construction shown in Fig. 5, the tube 10 is formed of two plies of cord fabrics, 12 and 13 alternately laid in opposite directions so that the individual cords thereof extend at a cord angle, i.e., the angle between the individual cords and the longitudinal axis of the tube X—X, indicated by the dimension C in Fig. 5, of between 10° and 44° and preferably between 30° and 40°. This arrangement of the cords provides a greater restraint in the longitudinal direction than in the transverse direction so that the tube 10 upon inflation takes the oblate shape as shown in Fig. 3. The outer surface of the outer ply 12 is provided with a skim coat or layer of rubber 14 and the inner surface of the inner ply 13 is similarly provided with a skim coat or layer of rubber 15 to render the tube 10 fluid impermeable.

In the construction shown in Fig. 6 tube 10 is formed of two plies of cord fabric, 16 and 17, alternately laid in different directions so that the individual cords thereof extend at a cord angle, indicated by the dimension D, in Fig. 6, in excess of 44° and a third ply 18, the individual cords of which extend substantially longitudinally, i.e., at approximately zero cord angle. The third ply 18 is provided only in the outer half of the tube 10 and provides restraint in a longitudinal direction so that the tube 10, upon inflation, does not expand outwardly to any substantial extent whereby the tube 10 upon inflation takes a substantially oblate shape as shown in Fig. 3. An outer layer of rubber 19 and an inner layer of rubber 20 render the tube fluid impermeable.

The tube 10, whether of the construction of Fig. 5 or Fig. 6, is fabricated on a drum in a manner analogous to that of forming a pneumatic tire. The plies of rubberized cord fabric and the layers of rubber are wrapped around the drum and spliced. The layers of rubber may have been previously applied to the plies as a skim coat or may be applied during fabrication on the drum. The outer surface of the band so formed is then covered with an adhesive preventing substance, such as powdered soapstone, and the lateral portions of the fabric and rubber layers are folded over and lap spliced to form the continuous tube. The hole for the valve stem is punched and the valve stem 11 applied thereover. The tube so fabricated is then cured or vulcanized in a suitable mold in a flattened condition so that the tube as molded will have a flattened band shape as shown in Fig. 1, and will return to this shape when deflated. The adhesive preventing substance prevents the opposed walls of the tube from sticking together prior to and during vulcanization.

The valve stem 11 is of a conventional type used for inner tubes and has a rubber base 21 by which it is bonded to the tube 10 during vulcanization. The valve stem 11 is provided with a special cap 22 adapted to be screwed onto the threaded end of the valve stem 11. The cap 22 carries a spring pressed check valve 23 which may be depressed to admit fluid under pressure through the valve stem 11 into the tube. The cap 22 has a plurality of spaced holes 24 drilled through the wall thereof below the check valve 23. When the cap 22 is completely screwed down these holes 24 will be covered up, as shown in Fig. 3, by the end of the valve stem so that fluid under pressure cannot escape therethrough. When it is desired to deflate the tube 10, the cap is merely unscrewed a few turns to uncover the holes 24, as shown in Figs. 4 and 7, to allow the fluid under pressure to escape. This arrangement facilitates the deflation of the tube 10 concurrently with the inflation of the tire T.

From the above description, it can be seen that there is provided an improved apparatus for compressing the tread of a tubeless tire to spread the beads thereof to effect initial sealing engagement thereof with the rim preparatory to the inflating of the tubeless tire. While certain preferred forms of the invention have been shown and described, it is to be understood that these are for the purpose of illustration only and that changes and modifications can be made therein without departing from the spirit and scope of the invention.

Having thus described my invention, what I claim and desire to protect by Letters Patent is:

1. Apparatus for compressing the tread of a tubeless tire to effect an initial seal between the beads of the tire and a rim preparatory to inflating the tire comprising, a flexible tube having a flattened band shape when uninflated, said tube being formed of plies of cord fabric coated with a fluid impermeable composition, individual cords of at least one of said plies in the outer wall of said tube extending more in the longitudinal direction of said tube than in its transverse direction whereby said cords provide greater restraint to stretch in a longitudinal direction than in a transverse direction, and means carried by the wall of said tube for introducing fluid under pressure into the tube to inflate and expand the tube.

2. Apparatus as in claim 1 in which said individual cords of at least one of said plies in the outer wall of said tube extend in substantially the longitudinal direction of said tube.

3. Apparatus for compressing the tread of a tubeless tire to effect an initial seal between the beads of a tire and a rim preparatory to inflating the tire comprising, a flexible inflatable tube having a flattened band shape when uninflated, said tube being formed of cord fabric coated with a fluid impermeable composition, the individual cords of said cord fabric extending at a cord angle of not greater than 40° and not less than 10° whereby the said tube will take a substantially oblate shape when inflated, and means carried by the outer wall thereof for introducing fluids under pressure into the tube to inflate and expand the tube.

4. Apparatus for compressing the tread of a tubeless tire to effect an initial seal between the beads of the tire and a rim preparatory to inflating the tire comprising, a flexible inflatable tube having a flattened band shape when uninflated, said tube being formed of cord fabric coated with a fluid impermeable composition, the individual cords of said cord fabric extending at a cord angle of between 30° and 40° and means carried by the wall of said tube for introducing fluid under pressure into said tube to thereby inflate and expand said tube.

5. Apparatus for compressing the tread of a tubeless tire to effect an initial seal between the beads of the tire and a rim preparatory to inflating the tire comprising, a flexible tube having a flattened band shape when uninflated, said tube being formed of at least two plies of cord fabric coated with rubber, the individual cords of said cord fabric extending at a cord angle of not greater than 44° and not less than 10°, and means carried by the outer wall of said tube for introducing fluid under pressure into said tube to inflate and expand said tube.

(References on following page)

References Cited in the file of this patent

UNITED STATES PATENTS

| | | | |
|---|---|---|---|
| 489,714 | Palmer | Jan. 10, | 1893 |
| 1,004,986 | Burkett | Oct. 3, | 1911 |
| 1,559,972 | Midgley | Nov. 3, | 1925 |
| 1,707,794 | Blaker | Apr. 2, | 1929 |
| 1,884,144 | Norquist | Oct. 25, | 1932 |
| 1,966,580 | Bull | July 17, | 1934 |
| 2,322,962 | Dickson et al. | June 29, | 1943 |
| 2,394,290 | Butler | Feb. 5, | 1946 |
| 2,666,007 | Hovey | Jan. 12, | 1954 |
| 2,679,662 | Pfeiffer | June 1, | 1954 |
| 2,684,112 | Coats | July 20, | 1954 |